United States Patent
Ibrahim et al.

(10) Patent No.: US 12,370,534 B1
(45) Date of Patent: Jul. 29, 2025

(54) g-$C_3N_4$@CuO/MgAl$_2$O$_4$ NANOCOMPOSITE SYNTHESIS FOR HYDROGEN GENERATION

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Mohamed Khairy Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/075,659

(22) Filed: Mar. 10, 2025

(51) Int. Cl.
| | | |
|---|---|---|
| *B01J 27/24* | (2006.01) | |
| *B01J 23/00* | (2006.01) | |
| *B01J 23/02* | (2006.01) | |
| *B01J 35/40* | (2024.01) | |
| *B01J 35/45* | (2024.01) | |
| *B01J 35/61* | (2024.01) | |
| *B01J 35/63* | (2024.01) | |
| *B01J 35/64* | (2024.01) | |
| *B01J 37/04* | (2006.01) | |
| *B01J 37/08* | (2006.01) | |
| *C01B 3/06* | (2006.01) | |

(52) U.S. Cl.
CPC .............. *B01J 27/24* (2013.01); *B01J 23/005* (2013.01); *B01J 23/02* (2013.01); *B01J 35/40* (2024.01); *B01J 35/45* (2024.01); *B01J 35/613* (2024.01); *B01J 35/633* (2024.01); *B01J 35/647* (2024.01); *B01J 37/04* (2013.01); *B01J 37/088* (2013.01); *C01B 3/065* (2013.01)

(58) Field of Classification Search
CPC ........ B01J 35/45; B01J 35/647; B01J 35/613; B01J 35/633; B01J 35/40; B01J 23/005; B01J 23/02; B01J 23/04; B01J 37/04; B01J 37/088; C01B 3/065
See application file for complete search history.

(56) References Cited

FOREIGN PATENT DOCUMENTS

| | | |
|---|---|---|
| CN | 109647487 A | 4/2019 |
| CN | 117000283 A | 11/2023 |
| CN | 114433165 B | 9/2024 |

OTHER PUBLICATIONS

Rahmanivahid et al., Molecules, (2019), v.23, p. 2597 (1-18).*
Shifa Wang, et al., "Construction of g-C3N4/Au/MgAl2O4 photocatalysts with different coupling methods to improve the photodegradation behavior and performance prediction", Journal of Environmental Chemical Engineering, vol. 11, Issue 06, Dec. 2023, 111453, 9 Pages.

* cited by examiner

*Primary Examiner* — Yong L Chu
(74) *Attorney, Agent, or Firm* — Oblon, McClelland, Maier & Neustadt, L.L.P.

(57) ABSTRACT

A method for hydrogen ($H_2$) generation includes reacting sodium borohydride ($NaBH_4$) with water in the presence of a graphite-phase carbon nitride copper oxide and magnesium aluminum oxide (g-$C_3N_4$@CuO/MgAl$_2$O$_4$) nanocomposite to hydrolyze the sodium borohydride and generate hydrogen. The g-$C_3N_4$@CuO/MgAl$_2$O$_4$ nanocomposite comprises a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

20 Claims, 5 Drawing Sheets

100 # g-C$_3$N$_4$@CuO/MgAl$_2$O$_4$ NANOCOMPOSITE SYNTHESIS FOR HYDROGEN GENERATION

BACKGROUND

Technical Field

The present disclosure is directed towards hydrogen (H$_2$) generation techniques, and more particularly relates to a method of production of hydrogen using a graphite-phase carbon nitride copper oxide and magnesium aluminum oxide (g-C$_3$N$_4$@CuO/MgAl$_2$O$_4$) nanocomposite and a method of synthesis thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Rapid industrialization and increases in global population have led to an escalating demand for energy. Growing energy demands have necessitated exploration and development of alternative energy sources capable of supplementing or replacing conventional non-renewable energy resources. Depletion of fossil fuel reserves, coupled with increasing environmental concerns regarding greenhouse gas emissions and climate change, has compelled societies to transition towards clean and renewable energy solutions. Solar energy represents one such renewable energy source that is both widely available and cost-effective in terms of energy generation; however, a limitation of solar energy is an associated energy storage challenge. Energy harvested from solar power needs to be stored efficiently to be available during non-sunlight hours and/or periods of high demand. Conventional battery storage systems, while commonly employed, present drawbacks including high capital costs, frequent replacement needs, limited lifespan, performance degradation over time, and environmental disposal concerns associated with toxic and hazardous materials used in battery manufacturing. Cost and complexity of safely recycling and/or disposing of batteries further exacerbate the challenges of batteries, posing barriers to the widespread adoption of battery-based energy storage solutions.

Hydrogen (H$_2$) energy storage and fuel cell technologies have emerged as an alternative to conventional battery storage systems, offering a plurality of advantages. Hydrogen is an inherently clean energy carrier that, when utilized in fuel cells, emits only water vapor as a byproduct. Hydrogen possesses a high energy density relative to conventional battery technologies, permitting the storage of large amounts of energy in a compact volume. The high energy density of hydrogen makes it particularly advantageous for transportation applications where weight and space are influential factors. Hydrogen-powered fuel cells enable rapid refueling, with refueling times comparable to those of gasoline-powered vehicles, which contrasts with the extended charging durations associated with battery electric vehicles (BEVs). Hydrogen fuel cells offer extended operational ranges, making them well-suited for heavy-duty applications, such as commercial trucking, maritime transport, and aviation. Hydrogen-based systems are lighter than equivalent battery-based storage solutions, enhancing efficiency and payload capacity. Hydrogen may be produced via electrolysis using renewable energy sources such as solar and wind power, allowing for sustainable, large-scale energy storage solutions. Unlike batteries, which suffer from degradation over time, hydrogen storage and fuel cell systems may maintain consistent performance over extended periods with proper maintenance, reducing the need for frequent replacement.

Despite advantages, current methodologies and materials used for hydrogen production, storage, and utilization present technical and economic challenges. The production of hydrogen through conventional methods, such as steam methane reforming (SMR), results in carbon emissions unless coupled with carbon capture and storage (CCS) technologies. Electrolysis-based hydrogen production, while cleaner, remains cost-intensive due to the high energy input requirements and limited efficiency of current electrolyzer technologies. Existing hydrogen storage methods, including high-pressure gaseous storage and cryogenic liquid storage, require advanced materials and engineering solutions to ensure safe, efficient, and cost-effective containment. Infrastructure limitations pose a barrier to the widespread adoption of hydrogen energy. The existing energy distribution network is designed for fossil fuels and electrical grids, necessitating an investment in hydrogen production, distribution, and refueling infrastructure. Fuel cell technology, while promising, needs further advancements in catalyst materials, membrane durability, and system efficiency to achieve cost parity with conventional energy solutions.

There exists a need for improved methods, materials, and systems for hydrogen production, storage, and utilization that address current limitations. Advancements in hydrogen storage technologies, including solid-state materials, chemical carriers, and high-efficiency electrolysis methods, may enhance economic viability and scalability of hydrogen as a sustainable energy solution. Improved fuel cell designs with high efficiency, longevity, and reduced reliance on rare and/or expensive materials may accelerate the transition to a hydrogen-based energy economy.

Accordingly, an object of the present disclosure is to provide a method for hydrogen (H$_2$) generation using a graphite-phase carbon nitride copper oxide and magnesium aluminum oxide (g-C$_3$N$_4$@CuO/MgAl$_2$O$_4$) nanocomposite, that may circumvent the drawbacks and limitations, such as, low catalytic efficiency, limited stability, high production costs, and environmental concerns, of methods and materials known in the art.

SUMMARY

In an exemplary embodiment, a method for hydrogen (H$_2$) generation is described. The method includes reacting sodium borohydride (NaBH$_4$) with water in the presence of a graphite-phase carbon nitride copper oxide and magnesium aluminum oxide (g-C$_3$N$_4$@CuO/MgAl$_2$O$_4$) nanocomposite to hydrolyze the sodium borohydride and generate hydrogen. The g-C$_3$N$_4$@CuO/MgAl$_2$O$_4$ nanocomposite comprises a graphite-phase carbon nitride (g-C$_3$N$_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-C$_3$N$_4$@CuO/MgAl$_2$O$_4$ nanocomposite.

In some embodiments, the hydrogen is generated at a hydrogen generation rate from 1300 to 1500 milliliters per min per gram (mL/min/gm) of the g-C$_3$N$_4$@CuO/MgAl$_2$O$_4$ nanocomposite.

In some embodiments, the contacting occurs at a temperature of 30 to 50° C.

In some embodiments, contacting the sodium borohydride with water in the presence of the g-$C_3N_4$@CuO/MgAl$_2$O$_4$ nanocomposite generates 6 to 8 times more hydrogen after 10 minutes in comparison to contacting the sodium borohydride with water in the absence of the g-$C_3N_4$@CuO/MgAl$_2$O$_4$ nanocomposite.

In some embodiments, the g-$C_3N_4$@CuO/MgAl$_2$O$_4$ nanocomposite has interplanar spacings of 0.22 to 0.24 nanometers (nm), 0.21 to 0.23 nm, 0.16 to 0.18 nm, 0.14 to 0.15 nm, 0.12 to 0.13 nm, and 0.09 to 0.11 nm.

In some embodiments, the g-$C_3N_4$@CuO/MgAl$_2$O$_4$ nanocomposite includes a graphite-phase carbon nitride (g-$C_3N_4$) in an amount of 5 to 15 percent by weight (wt. %) to 15, copper oxide (CuO) in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

In some embodiments, the g-$C_3N_4$ is in the form of nanosheets having an average length of 100 to 500 nm and an average width of 50 to 250 nm.

In some embodiments, the copper oxide and the MgAl$_2$O$_4$ are in the form of nanoparticles having an average size of 2 to 10 nm, where the copper oxide and the MgAl$_2$O$_4$ nanoparticles are dispersed on the g-$C_3N_4$ nanosheets.

In some embodiments, the g-$C_3N_4$@CuO/MgAl$_2$O$_4$ nanocomposite has a Brunauer-Emmett-Teller (BET) surface area of 15 to 30 square meters per gram (m$^2$ g$^{-1}$).

In some embodiments, the g-$C_3N_4$@CuO/MgAl$_2$O$_4$ nanocomposite is porous and has an average pore diameter of 5 to 10 nm.

In some embodiments, the g-$C_3N_4$@CuO/MgAl$_2$O$_4$ nanocomposite is porous and has an average pore volume of 0.01 to 0.2 cubic centimeters per gram (cm$^3$ g$^{-1}$).

In some embodiments, the g-$C_3N_4$@CuO/MgAl$_2$O$_4$ nanocomposite is porous, and the pores are in the form of slits.

In some embodiments, the g-$C_3N_4$@CuO/MgAl$_2$O$_4$ nanocomposite is crystalline.

In some embodiments, the g-$C_3N_4$@CuO/MgAl$_2$O$_4$ nanocomposite includes a copper oxide (CuO) phase, a magnesium oxide (MgO) phase, a magnesium aluminum oxide (MgAl$_2$O$_4$) phase, and a graphite-phase carbon nitride (g-$C_3N_4$) phase.

In some embodiments, the MgAl$_2$O$_4$ phase is spinel.

In some embodiments, the MgO phase is cubic.

In some embodiments, the g-$C_3N_4$@CuO/MgAl$_2$O$_4$ nanocomposite does not include aluminum oxide (Al$_2$O$_3$).

In some embodiments, a process of making the g-$C_3N_4$@CuO/MgAl$_2$O$_4$ nanocomposite is described. The process includes mixing a magnesium (Mg) salt, an aluminum (Al) salt, a copper (Cu) salt, and a fuel in water to form a mixture. The process further includes heating the mixture to form a solid product, calcinating the solid product at a temperature of 600 to 800° C. for 2 to 4 hours to form a product, mixing the product with urea, and heating to a temperature of 550 to 650° C. for 20 to 60 minutes to form the g-$C_3N_4$@CuO/MgAl$_2$O$_4$ nanocomposite.

In some embodiments, the fuel is menthol.

In some embodiments, the contacting occurs for 0.5 to 20 minutes.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions, and other parameters are expressed in the form of a range, a preferable range, an upper limit value, a lower limit value or preferable upper and lower limit values, it should be understood that any ranges obtainable by combining any upper limit or preferable value with any lower limit or preferable value are also specifically disclosed, irrespective of whether the obtained ranges are clearly mentioned in the context.

As used herein, the term "amount" refers to the level or concentration of one or more reactants, catalysts, and/or materials present in a reaction mixture.

As used herein, the term "particle" refers to an object that acts as a whole unit with regard to its transport and properties.

As used herein, the term "average particle size" refers to the mean size of particles in a sample, typically determined by measuring the distribution of particle sizes and calculating the average value, often through techniques such as dynamic light scattering (DLS) and/or scanning electron microscopy (SEM).

As used herein, the term "pore size" refers to the average diameter or width of pores within a material, typically determined by methods such as nitrogen adsorption-desorption, mercury intrusion porosimetry, and/or scanning electron microscopy (SEM). Pore size is a parameter for characterizing the porosity and surface area of materials, especially in nanocomposites or catalysts.

As used herein, the term "surface area" refers to the total area of an exposed surface of a material per unit of mass or volume. It is typically measured in square meters per gram ($m^2/g$) and is a parameter for characterizing the adsorption capacity, reactivity, and porosity of a material, such as a nanocomposite. Surface area provides insights into how well a material can interact with other substances, such as molecules of a dye or other pollutants in a solution.

As used herein, the term "nanocomposite" refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. The nanocomposites may be poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC), and/or any combination thereof. Nanocomposites may be used in various applications, including catalysis, environmental remediation, electronics, and materials science.

As used herein, the term "slit" or "slit-like" refers to an opening having a height that is substantially longer, e.g., 2×, 3×, 4×, 5×, or 10× greater, than the width of the opening.

As used herein, the term "nanoparticles (NPs)" refers to particles having a particle size of 1 to 500 nanometers (nm). The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like.

As used herein the term "disposed" refers to being positioned, placed, deposited, arranged, and/or distributed in a particular manner.

As used herein, the term "X-ray diffraction," "XRD," or "X-ray crystallography" refers to a technique for obtaining information on the atomic structure of crystalline materials used as a standard laboratory technique. Unless otherwise specified, the term XRD shall include an analytical technique based on the diffraction of X-rays by matter, especially for crystalline materials.

As used herein, the term "scanning electron microscopy" or "SEM" refers to a surface-imaging technique that produces images of a sample by scanning the sample with a focused beam of electrons. Unless otherwise specified, the term SEM shall include all imaging techniques using electron beams for imaging.

As used herein, the term "interplanar spacings" refers to the distances between adjacent planes of atoms in a crystal lattice, typically measured in nanometers (nm) or angstroms (Å).

As used herein, the term "plane spacings" refers to the distances between parallel planes of atoms within a crystal structure, typically measured in nanometers (nm) or angstroms (Å).

In the present disclosure, a numerical value interval (i.e., a numerical value range) may be involved, and, if not specifically stated, an optional numerical value distribution may be considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be a constant temperature and allowed to be varied within a certain temperature interval.

The constant temperature allows the temperature to fluctuate within the precision range of the instrument control. It is allowed to fluctuate in the range of, for example, 5° C., 4° C., 3° C., 2° C., and 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of the present disclosure are directed towards a method for hydrogen ($H_2$) generation with a graphite-phase carbon nitride copper oxide and magnesium aluminum oxide (g-$C_3N_4$@CuO/Mg$Al_2O_4$) nanocomposite (also referred to as "nanocomposite," "g-$C_3N_4$@CuO/Mg$Al_2O_4$ catalyst," and "catalyst") as a catalyst to enhance hydrolysis of sodium borohydride (Na$BH_4$) for efficient production of hydrogen gas. The catalyst facilitates safe and rapid release of hydrogen from Na$BH_4$, making it an efficient solution for clean hydrogen production. The present disclosure circumvents the drawbacks of prior art by addressing limitations such as high catalyst costs, slow reaction rates, and environmental concerns. Traditional catalysts often use expensive materials and result in inefficient or slow hydrogen production. The present disclosure uses a cost-effective catalyst that promotes fast hydrogen generation without relying on toxic or scarce materials. The simplicity of its preparation and its high catalytic activity also promote scalability and practical applicability without needing to apply a potential or use electrodes, making it a more efficient and sustainable alternative to existing methods.

Figure 1A:
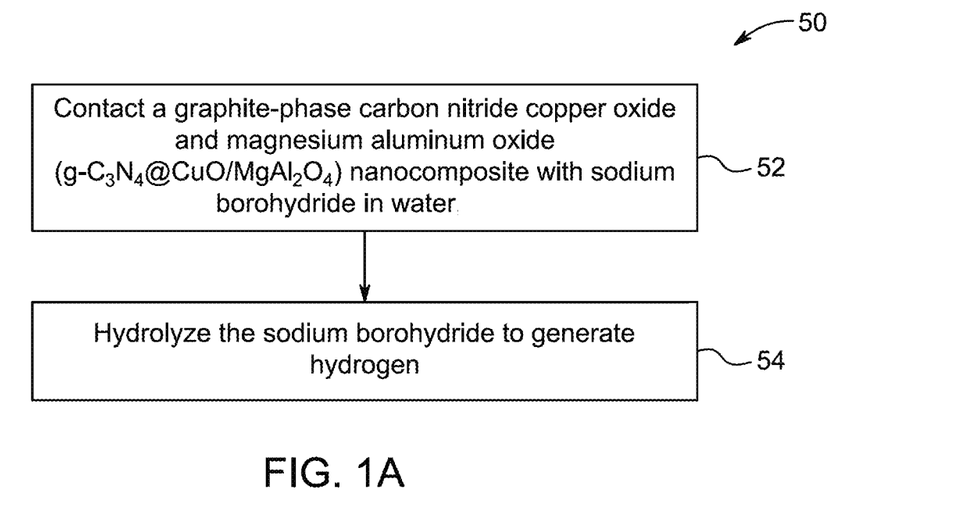
FIG. 1A is a schematic flow chart of a method of hydrogen (H$_2$) generation, according to certain embodiments.

Aspects of the present disclosure pertain to a method for hydrogen generation with a g-$C_3N_4$@CuO/MgAl$_2$O$_4$ nanocomposite. FIG. 1A illustrates a schematic flow chart of a method 50 of hydrogen generation. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting a graphite-phase carbon nitride copper oxide and magnesium aluminum oxide (g-$C_3N_4$@CuO/MgAl$_2$O$_4$) nanocomposite with sodium borohydride in water. In some embodiments, the contacting occurs at a temperature of 30 to 50° C., preferably 35-55° C., preferably 40-50° C., more preferably 40-45° C., and yet more preferably about 40° C. In some embodiments, the contacting occurs for 0.5 to 20 minutes, preferably 1-17 minutes, preferably 2-15 minutes, preferably 5-12 minutes, and preferably 8-10 minutes.

In some embodiments, other borohydride salts, such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, combinations thereof, and the like, may be used in place of or in combination with sodium borohydride during the contacting.

At step 54, the method 50 includes hydrolyzing the sodium borohydride to generate hydrogen. The sodium borohydride in water reacts with the g-$C_3N_4$@CuO/MgAl$_2$O$_4$ nanocomposite to hydrolyze the sodium borohydride and generate hydrogen. In some embodiments, the hydrogen is generated at a hydrogen generation rate of 1300 to 1500 mL/min per gram of the g-$C_3N_4$@CuO/MgAl$_2$O$_4$ nanocomposite, preferably of 1320-1480 mL/min per gram of the g-$C_3N_4$@CuO/MgAl$_2$O$_4$ nanocomposite, preferably 1340-1460 mL/min per gram of the g-$C_3N_4$@CuO/MgAl$_2$O$_4$ nanocomposite, preferably 1360-1440 mL/min per gram of the g-$C_3N_4$@CuO/MgAl$_2$O$_4$ nanocomposite, and more preferably 1380-1420 mL/min per gram of the g-$C_3N_4$@CuO/MgAl$_2$O$_4$ nanocomposite. In a preferred embodiment, hydrogen is generated at a hydrogen generation rate of about 1400 mL/min per gram of the g-$C_3N_4$@CuO/MgAl$_2$O$_4$ nanocomposite.

In some embodiments, a weight ratio of the g-$C_3N_4$@CuO/MgAl$_2$O$_4$ nanocomposite to the sodium borohydride is from 1:100 to 100:1, preferably 1:90 to 90:1, preferably 1:80 to 80:1, preferably 1:70 to 70:1, preferably 1:60 to 60:1, preferably 1:50 to 50:1, preferably 1:40 to 40:1, preferably 1:30 to 30:1, preferably 1:20 to 20:1, preferably 1:10 to 10:1, preferably 1:5 to 5:1, and preferably about 1:1. In some embodiments, a weight ratio of the sodium borohydride to the water is from 1:10 to 1:1000, preferably 1:20 to 1:900, preferably 1:30 to 1:800, preferably 1:40 to 1:700, preferably 1:50 to 1:600, preferably 1:60 to 1:500, preferably 1:70 to 1:400, preferably 1:80 to 1:300, preferably 1:90 to 1:200, an preferably about 1:100.

In one embodiment, contacting the sodium borohydride with water in the presence of the g-$C_3N_4$@CuO/MgAl$_2$O$_4$ nanocomposite generates 6 to 8 times, preferably 6.5 to 7.5 times, and preferably 6.8 to 7.2 times more hydrogen after 10 minutes in comparison to contacting the sodium borohydride with water in the absence of the g-$C_3N_4$@CuO/MgAl$_2$O$_4$ nanocomposite.

In some embodiments, a nanocomposite is described. The nanocomposite includes graphitic carbon nitride (g-$C_3N_4$), copper oxide (CuO), and magnesium aluminum oxide (MgAl$_2$O$_4$). In some embodiments, the nanocomposite or g-$C_3N_4$@CuO/MgAl$_2$O$_4$ nanocomposite includes a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

In some embodiments, graphite-phase carbon nitride (g-$C_3N_4$) may be present in the g-$C_3N_4$@CuO/MgAl$_2$O$_4$ nanocomposite in an amount of 5 to 15 percent by weight (wt. %), preferably 6 to 14 wt. %, preferably 7 to 13 wt. %, preferably 8 to 12 wt. %, more preferably 9 to 11 wt. %, and yet more preferably 9.5 to 10.5 wt. % based on the total weight of the g-$C_3N_4$@CuO/MgAl$_2$O$_4$ nanocomposite. In a preferred embodiment, graphite-phase carbon nitride (g-$C_3N_4$) is present in the g-$C_3N_4$@CuO/MgAl$_2$O$_4$ nanocomposite in an amount of about 10 wt. % based on the total weight of the g-$C_3N_4$@CuO/MgAl$_2$O$_4$ nanocomposite.

In some embodiments, copper oxide may be present in the g-$C_3N_4$@CuO/MgAl$_2$O$_4$ material in an amount of 3 to 7 wt. %, preferably 3.5 to 6.5 wt. %, more preferably 4 to 6 wt. %, and yet more preferably 4.5 to 5.5 wt. % based on the total weight of the g-$C_3N_4$@CuO/MgAl$_2$O$_4$ nanocomposite. In a preferred embodiment, copper oxide is present in the g-$C_3N_4$@CuO/MgAl$_2$O$_4$ nanocomposite in an amount of about 5 wt. % based on the total weight of the g-$C_3N_4$@CuO/MgAl$_2$O$_4$ nanocomposite.

In some embodiments, magnesium aluminum oxide (MgAl$_2$O$_4$) may be present in the g-$C_3N_4$@CuO/MgAl$_2$O$_4$ nanocomposite in an amount of 80 to 90 wt. %, preferably 81 to 89 wt. %, preferably 82 to 88 wt. %, preferably 83 to 87 wt. %, more preferably 84 to 86 wt. %, and yet more preferably 84.5 to 85.5 wt. % based on the total weight of the g-$C_3N_4$@CuO/MgAl$_2$O$_4$ nanocomposite. In a preferred embodiment, magnesium aluminum oxide (MgAl$_2$O$_4$) is present in the g-$C_3N_4$@CuO/MgAl$_2$O$_4$ nanocomposite in an amount of about 85 wt. % based on the total weight of the g-$C_3N_4$@CuO/MgAl$_2$O$_4$ nanocomposite.

In some embodiments, the g-$C_3N_4$ may exist in various morphological shapes, such as nanowires, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like. In preferred embodiment, the g-$C_3N_4$ is in the form of nanosheets.

In some embodiments, the g-$C_3N_4$ is in the form of nanosheets having an average length of 100 to 500 nm, preferably 125 to 450 nm, preferably 150 to 400 nm, preferably 175 to 350 nm, preferably 200 to 300 nm, preferably 210 to 250 nm, more preferably 220 to 230 nm, and yet more preferably about 222 nm, and an average width of 50 to 250 nm, preferably 75 to 200 nm, preferably 100 to 150 nm, preferably 125 to 145 nm, more preferably 130 to 140 nm, and yet more preferably about 135 nm.

In some embodiments, the copper oxide and the $MgAl_2O_4$ may exist in various morphological shapes, such as nanowires, nanosheets, nanocrystals, nanoparticles, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like. In a preferred embodiment, the copper oxide and the $MgAl_2O_4$ is in the form of spherical nanoparticles. In some embodiments, the copper oxide and the $MgAl_2O_4$ are in the form of spherical nanoparticles and are dispersed on the $g-C_3N_4$ nanosheets.

In some embodiments, the copper oxide and the $MgAl_2O_4$ is in the form of spherical nanoparticles having an average size of 2 to 10 nm, preferably 3 to 9 nm, preferably 4 to 8 nm, preferably 4.5 to 7 nm, more preferably 5 to 6 nm, and yet more preferably about 5.4 nm.

In some embodiments, the $g-C_3N_4@CuO/MgAl_2O_4$ nanocomposite is porous. A porous material is the one that forms a porous bulk solid. Pores may be micropores, mesopores, macropores, and/or a combination thereof. The pores may exist in the bulk material but not necessarily in the molecular structure of the material. As used herein, the term "microporous" refers to a nanocomposite having pores with an average pore width (i.e. diameter) of less than 2 nm. As used herein, the term "mesoporous" refers to pores of a nanocomposite having an average pore width of 2-50 nm. As used herein, the term "macroporous" refers to pores of a nanocomposite having an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the $g-C_3N_4@CuO/MgAl_2O_4$ nanocomposite is porous, and the pores may be in the form of cylinders, cones, spheres, tubes, funnels, irregular shapes, spherical voids, mesopores, micropores, macropores, capillaries, hexagonal pores, cubic pores, elongated pores, elliptical pores, slits, slit-like channels, plate-like pores, interconnected pores, branched pores, toroidal pores, spherical voids, cylindrical channels, oval pores, pocket pores, tubular pores, lamellar pores, nested pores, open pores, closed pores, porosity networks, wavy pores, zigzag pores, star-shaped pores, jagged pores, pyramidal pores, polyhedral pores, prism-shaped pores, web-like pores, tunnel pores, and multi-sized pores. In a preferred embodiment, the $g-C_3N_4@CuO/MgAl_2O_4$ nanocomposite is porous, and the pores are in the form of slits.

In some embodiments, the average pore distribution of the nanocomposite may include, but is not limited to, crystalline average pore distribution, bimodal, trimodal, multimodal, narrow, broad, and Gaussian. In an embodiment, the average pore distribution of nanocomposite is unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, and/or surface reactivity.

In some embodiments, the $g-C_3N_4@CuO/MgAl_2O_4$ nanocomposite has a Brunauer-Emmett-Teller (BET) surface area of 15 to 30 $m^2/g$, preferably 17 to 29 $m^2/g$, preferably 18 to 28 $m^2/g$, preferably 19 to 27 $m^2/g$, preferably 20 to 26 $m^2/g$, preferably 21 to 25 $m^2/g$, preferably 22 to 24.5 $m^2/g$, more preferably 23 to 24 $m^2/g$, and yet more preferably about 23.21 $m^2/g$. The BET hypothesis is the foundation for an analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the $g-C_3N_4@CuO/MgAl_2O_4$ nanocomposite is porous and has an average pore diameter of 5 to 10 nm, preferably 6 to 9.5 nm, preferably 7 to 9 nm, more preferably 8 to 8.5 nm, and yet more preferably about 8.34 nm.

In some embodiments, the $g-C_3N_4@CuO/MgAl_2O_4$ nanocomposite is porous and has an average pore volume of 0.01 to 0.2 $cm^3/g$, preferably 0.02 to 0.18 $cm^3/g$, preferably 0.03 to 0.16 $cm^3/g$, preferably 0.04 to 0.14 $cm^3/g$, preferably 0.05 to 0.12 $cm^3/g$, preferably 0.06 to 0.1 $cm^3/g$, preferably 0.07 to 0.09 $cm^3/g$, more preferably 0.075 to 0.085 $cm^3/g$, and yet more preferably about 0.081 $cm^3/g$.

In some embodiments, the $g-C_3N_4@CuO/MgAl_2O_4$ nanocomposite has interplanar spacings of 0.22 to 0.24 nm, 0.21 to 0.23 nm, 0.16 to 0.18 nm, 0.14 to 0.15 nm, 0.12 to 0.13 nm, and 0.09 to 0.11 nm.

In some embodiments, the $g-C_3N_4@CuO/MgAl_2O_4$ nanocomposite has an interplanar spacing 0.22 to 0.24 nm, preferably 0.222 to 0.238 nm, preferably 0.224 to 0.236 nm, preferably 0.226 to 0.234 nm, more preferably 0.228 to 0.232 nm, and yet more preferably about 0.23 nm, as determined by selected area electron diffraction (SAED) analysis. In a preferred embodiment, the $g-C_3N_4@CuO/MgAl_2O_4$ nanocomposite has an interplanar spacing of 0.23 nm which is attributed to a (111) CuO diffraction plane.

In some embodiments, the $g-C_3N_4@CuO/MgAl_2O_4$ nanocomposite has an interplanar spacing of 0.21 to 0.23 nm, preferably 0.212 to 0.228 nm, preferably 0.214 to 0.226 nm, preferably 0.216 to 0.224 nm, more preferably 0.218 to 0.220 nm, and yet more preferably about 0.219 nm, as determined by SAED analysis. In a preferred embodiment, the $g-C_3N_4@CuO/MgAl_2O_4$ nanocomposite has an interplanar spacing of 0.219 nm which is attributed to a (200) MgO diffraction plane.

In some embodiments, the $g-C_3N_4@CuO/MgAl_2O_4$ nanocomposite has an interplanar spacing of 0.16 to 0.18 nm, preferably 0.162 to 0.178 nm, preferably 0.164 to 0.176 nm, preferably 0.166 to 0.174 nm, more preferably 0.168 to 0.172 nm, and yet more preferably about 0.17 nm, as determined by SAED analysis. In a preferred embodiment, the $g-C_3N_4@CuO/MgAl_2O_4$ nanocomposite has an interplanar spacing of 0.17 nm which is attributed to a (422) spinel diffraction plane.

In some embodiments, the $g-C_3N_4@CuO/MgAl_2O_4$ nanocomposite has an interplanar spacing of 0.14 to 0.15 nm, preferably 0.141 to 0.149 nm, preferably 0.142 to 0.148 nm, preferably 0.144 to 0.147 nm, more preferably 0.145 to 0.146 nm, and yet more preferably about 0.146 nm, as determined by SAED analysis. In a preferred embodiment, the $g-C_3N_4@CuO/MgAl_2O_4$ nanocomposite has an interplanar spacing of 0.146 nm which is attributed to a (220) MgO diffraction plane.

In some embodiments, the g-$C_3N_4$@CuO/$MgAl_2O_4$ nanocomposite has an interplanar spacing of 0.12 to 0.13 nm, preferably 0.12 to 0.125 nm, preferably 0.121 to 0.124 nm, more preferably 0.122 to 0.123 nm, and yet more preferably about 0.122 nm, as determined by SAED analysis. In a preferred embodiment, the g-$C_3N_4$@CuO/$MgAl_2O_4$ nanocomposite has an interplanar spacing of 0.122 nm which is attributed to a (620) spinel diffraction plane.

In some embodiments, the g-$C_3N_4$@CuO/$MgAl_2O_4$ nanocomposite has an interplanar spacing of 0.09 to 0.11 nm, preferably 0.092 to 0.108 nm, preferably 0.094 to 0.106 nm, preferably 0.096 to 0.104, more preferably 0.098 to 0.102 nm, and yet more preferably about 0.1 nm, as determined by SAED analysis. In a preferred embodiment, the g-$C_3N_4$@CuO/$MgAl_2O_4$ nanocomposite has an interplanar spacing of 0.10 nm which is attributed to a (622) spinel diffraction plane.

In some embodiments, the nanocomposite may exist in various morphological shapes, including nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, nanosheets, tetrapods, combinations thereof, and the like.

In one embodiment, the g-$C_3N_4$@CuO/$MgAl_2O_4$ nanocomposite is crystalline. In some embodiments, the g-$C_3N_4$@CuO/$MgAl_2O_4$ nanocomposite includes a copper oxide (CuO) phase, a magnesium oxide (MgO) phase, a magnesium aluminum oxide ($MgAl_2O_4$) phase, and a graphite-phase carbon nitride (g-$C_3N_4$) phase. In some embodiments, the phases of the g-$C_3N_4$@CuO/$MgAl_2O_4$ nanocomposite may include, but are not limited to, crystalline, amorphous, monoclinic, orthorhombic, tetragonal, hexagonal, cubic, rhombohedral, triclinic, triclinic polymorph, spinel, tenorite, and a combination thereof. In an embodiment, the $MgAl_2O_4$ phase is spinel. In another embodiment, the MgO phase is cubic.

CuO is a p-type semiconductor with good redox properties, making it an active component for catalytic or photocatalytic reactions. MgO is a stable oxide that provides basic sites for catalysis and supports structural integrity. $MgAl_2O_4$ is a spinel-structured mixed metal oxide with high mechanical strength, thermal stability, and surface area.

MgO may exist in various phases like cubic, hexagonal, and puckered layers. $MgAl_2O_4$ may exist in a spinel phase. A spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions and 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C. and high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 grams per cubic centimeter (g/$cm^3$)), high thermal shock resistance, hydrophobicity, and low surface acidity.

In some embodiments, no more than 1 wt. % $Al_2O_3$ is present in the g-$C_3N_4$@CuO/$MgAl_2O_4$ nanocomposite. The minimal presence of $Al_2O_3$ (less than 1 wt. %, preferably less than 0.8 wt. %, preferably less than 0.5 wt. %, preferably less than 0.3 wt. %, preferably less than 0.1 wt. %, preferably less than 0.05 wt. %, more preferably less than 0.01 wt. %, and yet more preferably 0 wt. %) in the g-$C_3N_4$@CuO/$MgAl_2O_4$ nanocomposite helps to maintain enhanced catalytic properties, high surface reactivity, and efficient adsorption. In an embodiment, the g-$C_3N_4$@CuO/$MgAl_2O_4$ nanocomposite does not comprise aluminum oxide ($Al_2O_3$).

Figure 1B:
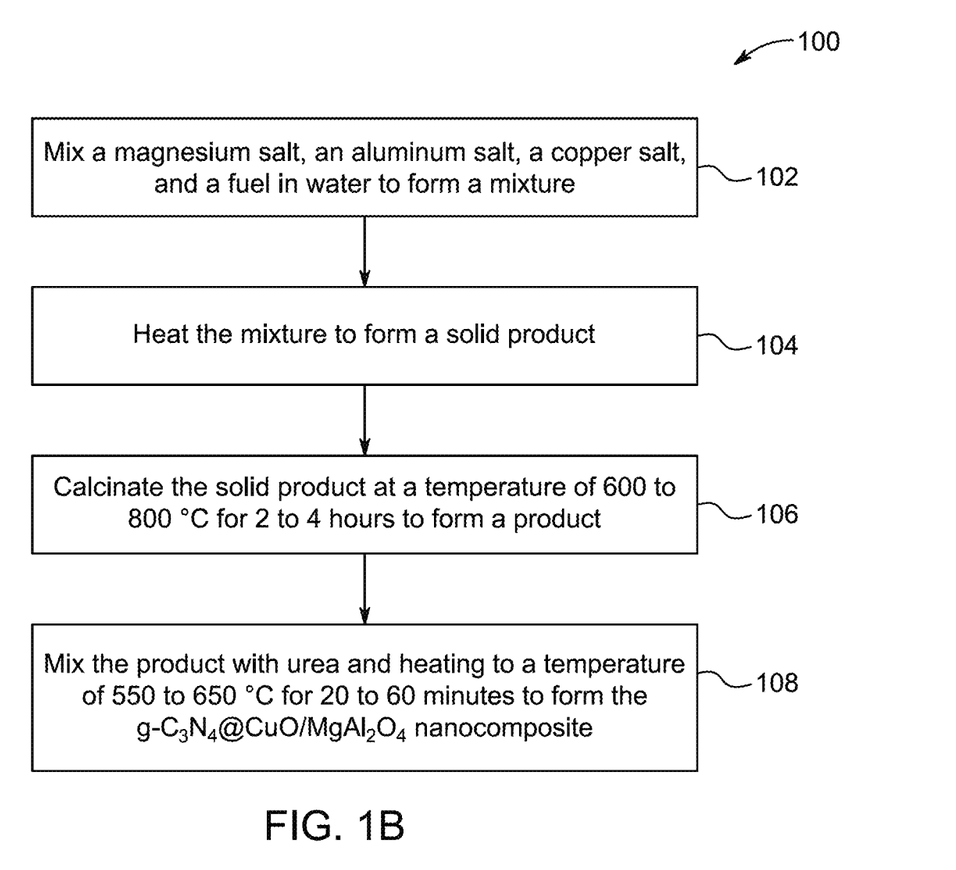
FIG. 1B is a schematic flow chart depicting a method of forming the graphite-phase carbon nitride copper oxide and magnesium aluminum oxide ($C_3N_4$@CuO/MgAl$_2$O$_4$) nanocomposite, according to certain embodiments.

FIG. 1B illustrates a schematic flow chart of a method 100 of preparing the g-$C_3N_4$@CuO/$MgAl_2O_4$ nanocomposite. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 includes mixing a magnesium salt, an aluminum salt, a copper salt, and a fuel in water to form a mixture. In some embodiments, magnesium salt may include, but is not limited to, magnesium sulfate, magnesium chloride, magnesium oxide, magnesium carbonate, magnesium hydroxide, magnesium nitrate, magnesium bromide, magnesium iodide, magnesium acetate, magnesium fluoride, magnesium tartrate, magnesium citrate, magnesium stearate, magnesium lactate, magnesium gluconate, magnesium salicylate, magnesium perchlorate, magnesium phosphate, magnesium arsenate, magnesium metaborate, magnesium silicate, magnesium molybdate, magnesium tungstate, magnesium chromate, magnesium aluminate, magnesium stannate, magnesium titanate, magnesium ferrocyanide, magnesium pyrophosphate, magnesium benzoate, a combination thereof, and the like. In a preferred embodiment, the magnesium salt is magnesium nitrate.

In some embodiments, aluminum salt may include, but is not limited to, aluminum sulfate, aluminum chloride, aluminum hydroxide, aluminum oxide, aluminum bromide, aluminum iodide, aluminum acetate, aluminum phosphate, aluminum nitrate, aluminum arsenate, aluminum nitrate hydrate, aluminum tartrate, aluminum citrate, aluminum fluoride, aluminum lactate, aluminum stearate, aluminum silicate, aluminum molybdate, aluminum tungstate, aluminum chromate, aluminum aluminate, aluminum oxalate, aluminum carbonate, aluminum borate, aluminum titanate, aluminum ferrocyanide, aluminum benzoate, aluminum pyrophosphate, aluminum acetylacetonate, a combination thereof, and the like. In a preferred embodiment, the aluminum salt is aluminum nitrate.

In some embodiments, copper salt may include, but is not limited to, copper sulfate, copper acetate, copper carbonate, copper chloride, copper bromide, copper iodide, copper cyanide, copper fluoride, copper thiocyanate, copper oxalate, copper tartrate, copper formate, copper citrate, copper propionate, copper benzoate, copper phosphate, copper chromate, copper arsenate, copper molybdate, copper tungstate, copper selenate, copper tellurate, copper silicate, copper hydroxide, copper perchlorate, copper chlorate, copper bromate, copper iodate, copper sulfate pentahydrate, copper nitrate, a combination thereof, and the like. In a preferred embodiment, the copper salt is copper nitrate.

In some embodiments, the fuel may include, but is not limited to, sucrose, glucose, fructose, lactose, maltose, menthol, glycerol, sorbitol, mannitol, ethylene glycol, propylene glycol, acetone, acetic acid, citric acid, tartaric acid, formic acid, urea, thiourea, hydrazine, glycine, alanine, valine, lysine, serine, leucine, aspartic acid, glutamic acid, ascorbic acid, oxalic acid, benzyl alcohol, polyethylene glycol. In a preferred embodiment, fuel is menthol.

At step 104, the method 100 includes heating the mixture to form a solid product. In some embodiments, the solution is heated at a temperature of 50 to 200° C., preferably 55 to 190° C., preferably 60 to 180° C., preferably 65 to 170° C., preferably 70 to 160° C., preferably 75 to 150° C., preferably 80 to 140° C., preferably 85 to 130° C., more preferably 90 to 120° C., and yet more preferably 95 to 110° C.

At step 106, the method 100 includes calcinating the solid product at a temperature of 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., more preferably 690 to 710° C., and yet more preferably about 700° C., for 2 to 4 hours, preferably 2.1 to 3.9 hours, preferably 2.2 to 3.8 hours, preferably 2.3 to 3.7 hours, preferably 2.4 to 3.6 hours, preferably 2.5 to 3.5 hours, preferably 2.6 to 3.4 hours, preferably 2.7 to 3.3 hours, preferably 2.8 to 3.2 hours, more preferably 2.9 to 3.1 hours, and yet more preferably about 3 hours to form a product. In a preferred embodiment, the solid is calcined at a temperature of 700° C. for 3 hours.

At step 108, the method 100 includes mixing the product with urea and heating to a temperature of 550 to 650° C., preferably 555 to 645° C., preferably 560 to 640° C., preferably 565 to 635° C., preferably 570 to 630° C., preferably 575 to 625° C., preferably 580 to 620, preferably 585 to 615° C., preferably 590 to 610° C., more preferably 595 to 605° C., and more preferably about 600° C., for 20 to 60 minutes, preferably 25 to 55 minutes, preferably 30 to 50 minutes, more preferably 35 to 45 minutes, and more preferably about 40 minutes, to form the g-$C_3N_4$@CuO/MgAl$_2$O$_4$ nanocomposite. In a preferred embodiment, mixture is heated at 600° C. for 40 minutes to form the g-$C_3N_4$@CuO/MgAl$_2$O$_4$ nanocomposite.

EXAMPLES

The following examples describe and demonstrate a method for hydrogen generation using g-$C_3N_4$@CuO/MgAl$_2$O$_4$ nanocomposite and a method of production thereof. The examples are provided solely for illustration and are not to be construed as limitations of the present disclosure, as many variations thereof are possible without departing from the spirit and scope of the present disclosure.

Example 1: Fabrication of a 10:5:85 wt. % Graphite-Phase Carbon Nitride Copper Oxide and Magnesium Aluminum Oxide (g-$C_3N_4$@CuO/MgAl$_2$O$_4$) Nanocomposite Magnesium nitrate (Mg(NO$_3$)$_2$) and aluminum nitrate (Al(NO$_3$)$_3$) were mixed in a beaker with copper nitrate (Cu(NO$_3$)$_2$) in predetermined amounts to obtain a composition including CuO@MgAl$_2$O$_4$. Approximately 10 grams of menthol ($C_{10}H_{20}O_0$) was added as a fuel source, followed by the addition of 30 milliliters (mL) of distilled water (DW). The resultant mixture was heated until a clear solution was obtained and further heated until dryness. The resulting product was ground using a mortar, transferred to a 150 mL porcelain dish, and subjected to calcination at 700° C. for 3.0 hours. After cooling to room temperature, the CuO/MgAl$_2$O$_4$ product was weighed and subsequently ground with a calculated amount of urea (CH$_4$N$_2$O) to achieve a desired ratio of g-$C_3N_4$@CuO/MgAl$_2$O$_4$ with a 10:5:85 wt. % nanocomposite composition. The prepared mixture was further placed in a covered porcelain crucible and heated at 600° C. for 40 minutes. After cooling to room temperature, the g-$C_3N_4$@CuO/MgAl$_2$O$_4$ (10:5:85 wt. %) nanocomposite was collected for further use.

Figure 2:
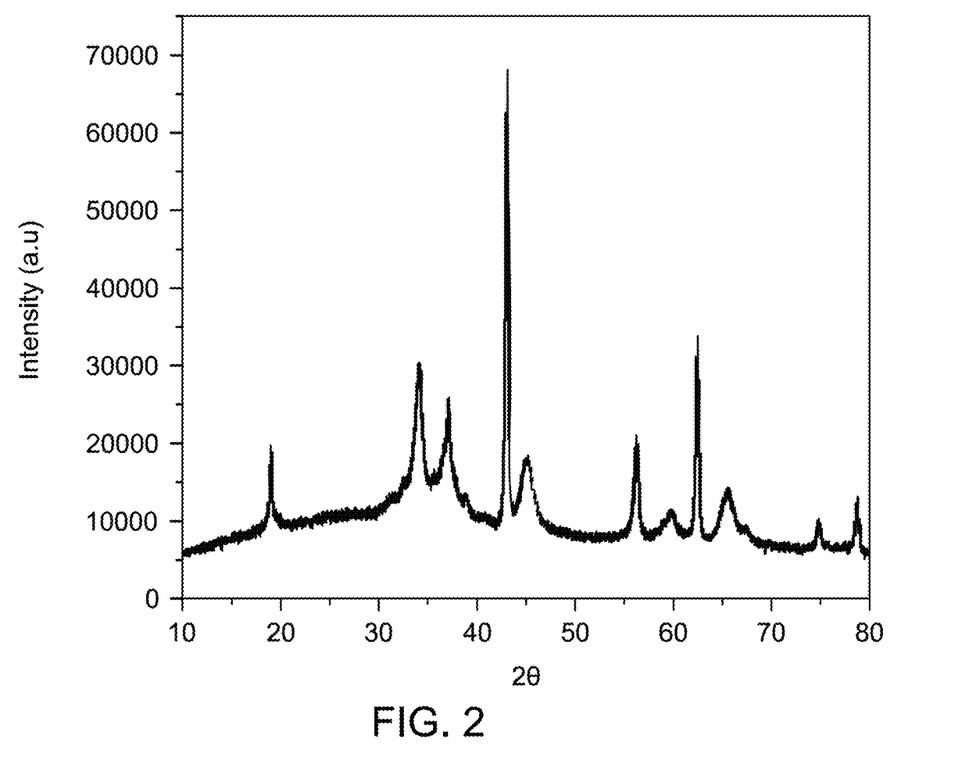
FIG. 2 depicts X-ray diffraction (XRD) spectra of the $C_3N_4$@CuO/MgAl$_2$O$_4$ nanocomposite, according to certain embodiments.

The crystalline structure and phase composition of the g-$C_3N_4$@CuO/MgAl$_2$O$_4$ catalyst were characterized by X-ray diffraction (XRD) analysis, as shown in FIG. 2. XRD patterns provide insights into crystallinity and specific phases of the g-$C_3N_4$@CuO/MgAl$_2$O$_4$ nanocomposite. The intense peaks and high intensity values indicated that the examined powder was highly crystalline. Examination of the diffraction patterns with the standard powder diffraction file (PDF) cards revealed the presence of copper(II) oxide (CuO), magnesium oxide (MgO), magnesium aluminate spinel (MgAl$_2$O$_4$), and graphitic carbon nitride (g-$C_3N_4$) phases. The MgAl$_2$O$_4$ spinel phase was indexed to the 2θ values of 18.9°, 37.0°, 38.9°, 45.2°, 56.1°, 65.01°, 74.7°, and 78.7°. These diffractions are assigned to Miller indices (111), (311), (222), (400), (422), (440), (620), and (622), respectively. The cubic phase of MgAl$_2$O$_4$ spinel was identified using the crystallography open database (COD) No. 9002164. The cubic phase of MgO was observed by COD No. 9006789 at 2θ values of 37.0°, 43.0°, 62.4°, and 74.7°, corresponding to the (111), (200), (220), and (311) planes, respectively. The presence of MgO with the MgAl$_2$O$_4$ spinel phase has also been examined [Kumar, C. M. S. et al., Solar energy: A promising renewable source for meeting energy demand in Indian agriculture applications, *Sustainable Energy Technologies and Assessments*, 2023, 55, 102905, which is incorporated herein by reference in its entirety]. Diffractions at 2θ values of 38.9°, and 65.5° were attributed to the tenorite phase of CuO, as identified by COD No. 9016326. The appearance of weak diffraction of CuO indicates the complete dissolution of the CuO within the whole lattices of both spinel and g-$C_3N_4$. The diffractions related to g-$C_3N_4$ were observed at 36.9°, 45.8°, and 590 using COD No. 1534042. No other phases were detected, such as Al$_2$O$_3$, indicating the successful fabrication of g-$C_3N_4$@CuO/MgAl$_2$O$_4$.

Figure 3A:
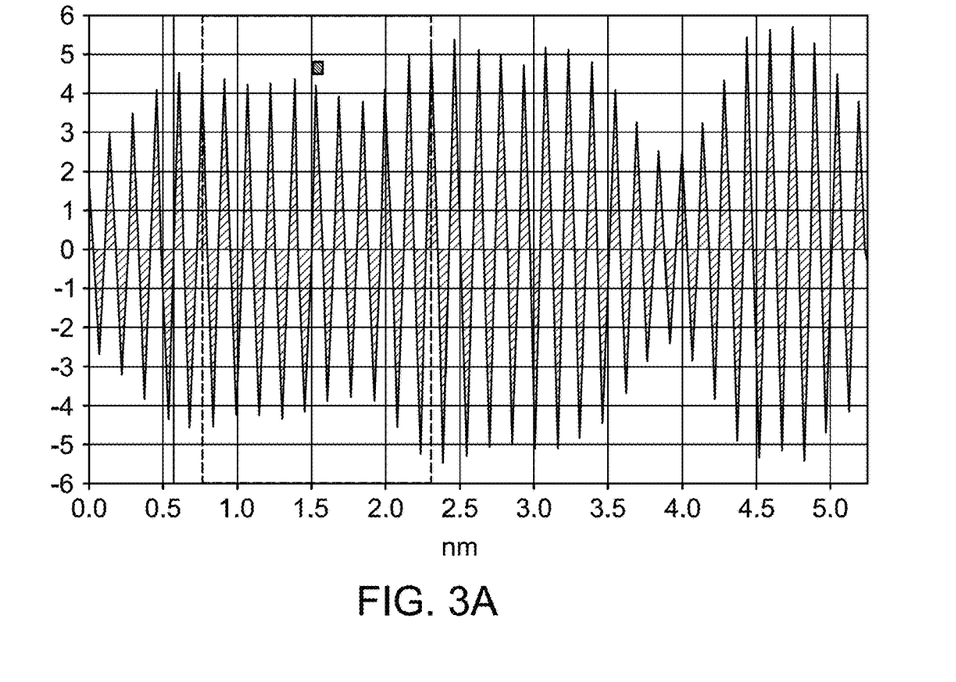
FIG. 3A is a fast Fourier transform (FFT) pattern of the g-$C_3N_4$@CuO/MgAl$_2$O$_4$ nanocomposite, according to certain embodiments.
Figure 3B:
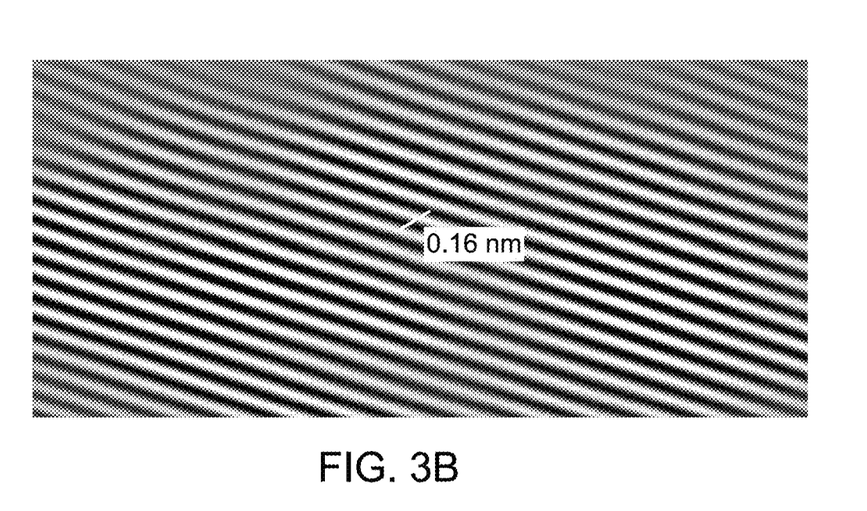
FIG. 3B is an inverse fast Fourier transform (IFFT) pattern of the g-$C_3N_4$@CuO/MgAl$_2$O$_4$ nanocomposite, according to certain embodiments.

Fast Fourier transform (FFT) and inverse fast Fourier transform (IFFT) measurements revealed a d-spacing value of 0.16 nm given to g-$C_3N_4$@CuO/MgAl$_2$O$_4$ nanocomposite, signifying the lattice spacing of (422), indicating the development of spinel structure, as shown in FIGS. 3A-3B.

Figure 3C:
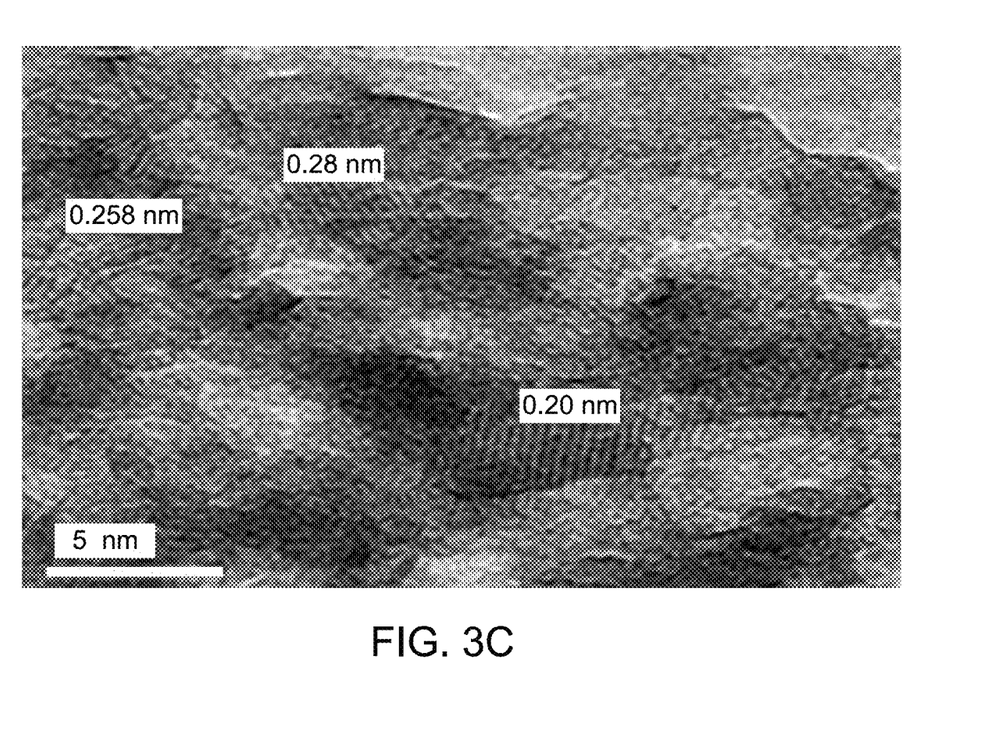
FIG. 3C is a high-resolution transmission electron microscopy (HR-TEM) image of the g-$C_3N_4$@CuO/MgAl$_2$O$_4$ nanocomposite, with a scale of 5 nm, according to certain embodiments.
Figure 3D:
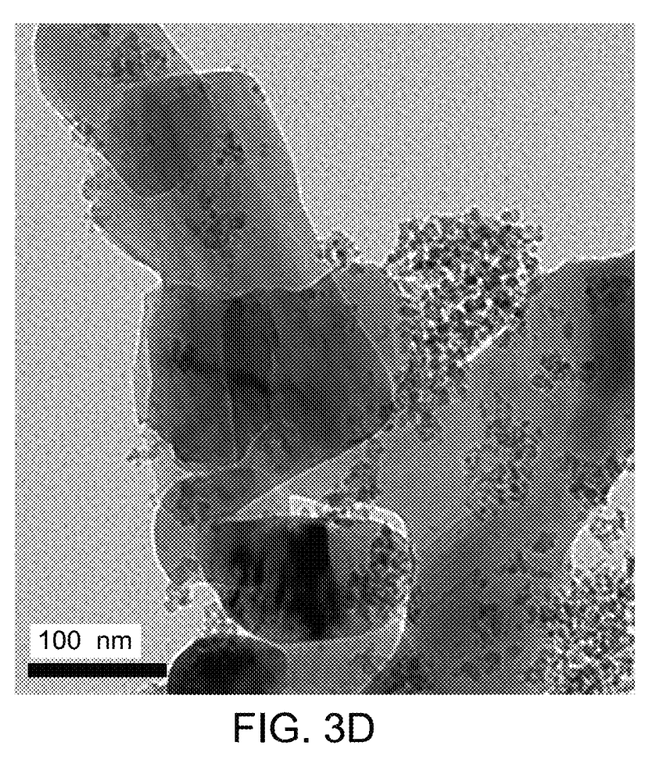
FIG. 3D is a transmission electron microscopy (TEM) image of the g-$C_3N_4$@CuO/MgAl$_2$O$_4$ nanocomposite, with a scale of 5 nanometers (nm), according to certain embodiments.
Figure 3E:
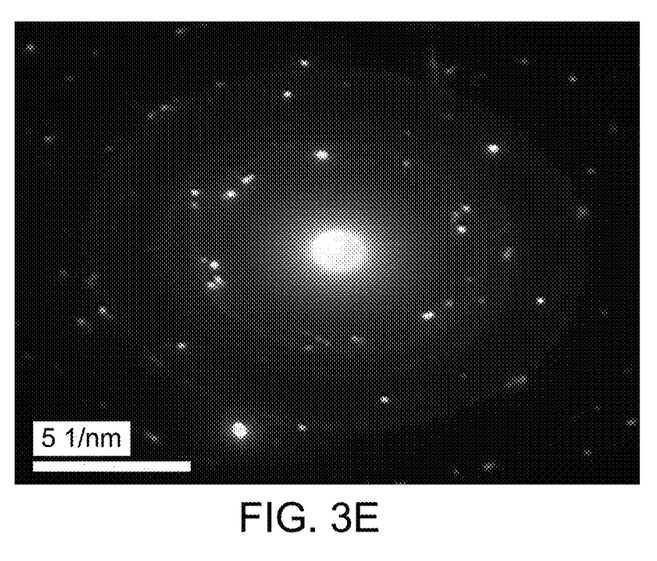
FIG. 3E is a selected area electron diffraction (SAED) image of the g-$C_3N_4$@CuO/MgAl$_2$O$_4$ nanocomposite, according to certain embodiments.

Transmission electron microscopy (TEM) images of the g-$C_3N_4$@CuO/MgAl$_2$O$_4$ nanocomposite, as shown in FIG. 3D, showed a two-dimensional (2D) porous structure constructed with curled and wrinkled nanosheets and platelets of g-$C_3N_4$ with an average width of 135 nanometer (nm) and a length of 222 nm. The image shows dispersion of homogeneous spherical metal oxides nanoparticles with a size 5.4 nm on nanosheets of g-$C_3N_4$. The corresponding high-resolution transmission electron microscopy (HR-TEM) of the g-$C_3N_4$@CuO/MgAl$_2$O$_4$ nanocomposite, as depicted in FIG. 3C, shows a plane spacing of 0.33 nm related to the (002) of carbon nitride (CN), where 0.25 nm, and 0.2 nm related to the (222) and (400) planes, respectively, which are of spinel, characterizing the heterostructure formation. The corresponding selected area electron diffraction (SAED) pattern, as shown in FIG. 3E, reveals diffraction spots with interplanar spacings of 0.23 nm, 0.219 nm, 0.17 nm, 0.146 nm, 0.122 nm, and 0.10 nm, corresponding to the diffraction planes (111) of copper oxide (CuO), (200) of magnesium oxide (MgO), (422) of spinel, (220) of MgO, (620) of spinel, and (622) of spinel, respectively.

Figure 4:
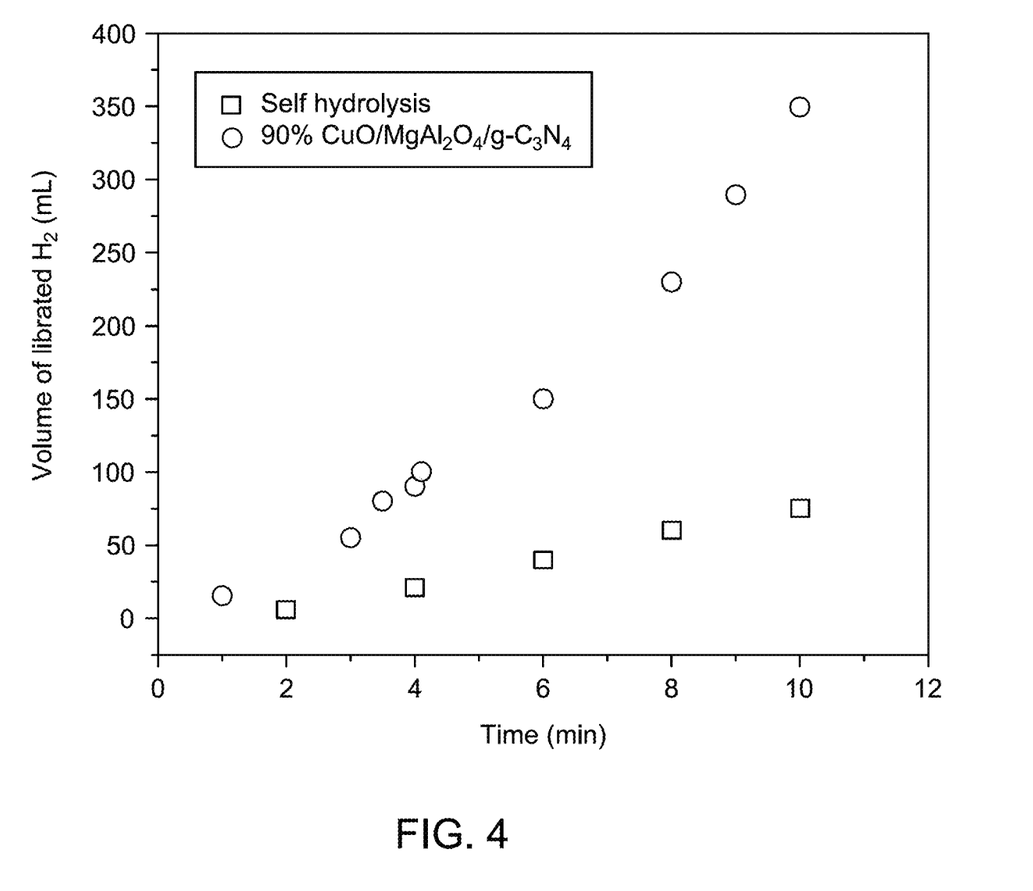
FIG. 4 depicts variation in a volume of liberated H$_2$ versus time over the g-$C_3N_4$@CuO/MgAl$_2$O$_4$ (10:5:85 wt. %) nanocomposite at a reaction temperature of 40° C., according to certain embodiments.

In the present disclosure, the g-$C_3N_4$@CuO/MgAl$_2$O$_4$ nanocomposite is utilized as a solid catalyst capable of partially splitting water in the presence of sodium borohydride, producing clean and pure hydrogen within minutes without a need for applying an external potential or using electrodes. The evaluations of the hydrolysis of sodium borohydride (NaBH$_4$) with and without the catalyst at a reaction temperature of 40° C. is shown in FIG. 4. The catalytic performance of the prepared catalyst exhibited a higher activity than the self-hydrolysis process. The g-$C_3N_4$@CuO/MgAl$_2$O$_4$ nanocomposite offers a hydrogen generation rate (HGR) of 1400 milliliters per minute per gram of nanocomposite (mL min$^{-1}$ g$^{-1}$) at 40° C.

Aspects of the present disclosure describe a method of hydrogen generation with a g-$C_3N_4$@CuO/MgAl$_2$O$_4$ nanocomposite. The g-$C_3N_4$@CuO/MgAl$_2$O$_4$ nanocomposite was characterized by XRD and TEM analysis. XRD confirmed the successful formation of g-$C_3N_4$@CuO/MgAl$_2$O$_4$ nanocomposite. The g-$C_3N_4$@CuO/MgAl$_2$O$_4$ nanocomposite split water with the aid of sodium borohydride to produce clean and pure hydrogen within minutes and without the need for applying external potential and/or utilizing electrodes.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method for hydrogen generation, comprising:
reacting sodium borohydride with water in the presence of a graphite-phase carbon nitride copper oxide and magnesium aluminum oxide (g-$C_3N_4$@CuO/MgAl$_2$O$_4$) nanocomposite to hydrolyze the sodium borohydride and generate hydrogen,
wherein the g-$C_3N_4$@CuO/MgAl$_2$O$_4$ nanocomposite comprises a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

2. The method of claim 1, wherein the hydrogen is generated at a hydrogen generation rate is from 1300 to 1500 mL/min per gram of g-$C_3N_4$@CuO/MgAl$_2$O$_4$ nanocomposite.

3. The method of claim 1, wherein contacting occurs at a temperature of 30 to 50° C.

4. The method of claim 1, wherein contacting the sodium borohydride with water in the presence of the g-$C_3N_4$@CuO/MgAl$_2$O$_4$ nanocomposite generates with 6 to 8 times more hydrogen is generated after 10 minutes in comparison to contacting wherein contacting the sodium borohydride with water in the absence of the g-$C_3N_4$@CuO/MgAl$_2$O$_4$ nanocomposite.

5. The method of claim 1, wherein the g-$C_3N_4$@CuO/MgAl$_2$O$_4$ nanocomposite has interplanar spacings of 0.22 to 0.24 nm, 0.21 to 0.23 nm, 0.16 to 0.18 nm, 0.14 to 0.15 nm, 0.12 to 0.13 nm, and 0.09 to 0.11 nm.

6. The method of claim 1, wherein the g-$C_3N_4$@CuO/MgAl$_2$O$_4$ nanocomposite comprises a graphite-phase carbon nitride (g-$C_3N_4$) in an amount of 5 to 10 percent by weight (wt. %), copper oxide in an amount of 3 to 5 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

7. The method of claim 6, wherein the g-$C_3N_4$ is in the form of nanosheets having an average length of 100 to 500 nm and an average width of 50 to 250 nm.

8. The method of claim 7, wherein the copper oxide and the MgAl$_2$O$_4$ are in the form of nanoparticles having an average size of 2 to 10 nm and wherein the copper oxide and the MgAl$_2$O$_4$ nanoparticles are dispersed on the g-$C_3N_4$ nanosheets.

9. The method of claim 1, wherein the g-$C_3N_4$@CuO/MgAl$_2$O$_4$ nanocomposite has a Brunauer-Emmett-Teller (BET) surface area of 15 to 30 m$^2$ g$^{-1}$.

10. The method of claim 1, wherein the g-$C_3N_4$@CuO/MgAl$_2$O$_4$ nanocomposite is porous and has an average pore diameter of 5 to 10 nm.

11. The method of claim 1, wherein the g-$C_3N_4$@CuO/MgAl$_2$O$_4$ nanocomposite is porous and has an average pore volume of 0.01 to 0.2 cm$^3$ g$^{-1}$.

12. The method of claim 1, wherein the g-$C_3N_4$@CuO/MgAl$_2$O$_4$ nanocomposite is porous, and the pores are in the form of slits.

13. The method of claim 1, wherein the g-$C_3N_4$@CuO/MgAl$_2$O$_4$ nanocomposite is crystalline.

14. The method of claim 1, wherein the g-$C_3N_4$@CuO/MgAl$_2$O$_4$ nanocomposite comprises a copper oxide (CuO) phase, a magnesium oxide (MgO) phase, a magnesium aluminum oxide (MgAl$_2$O$_4$) phase, and a graphite-phase carbon nitride (g-$C_3N_4$) phase.

15. The method of claim 14, wherein the MgAl$_2$O$_4$ phase is spinel.

16. The method of claim 14, wherein the MgO phase is cubic.

17. The method of claim 1, wherein the g-$C_3N_4$@CuO/MgAl$_2$O$_4$ nanocomposite does not comprise aluminum oxide (Al$_2$O$_3$).

18. The method of claim 1, wherein the g-$C_3N_4$@CuO/MgAl$_2$O$_4$ nanocomposite is made by a process, comprising:
mixing a magnesium salt, an aluminum salt, a copper salt, and a fuel in water to form a mixture;
heating the mixture to form a solid product;
calcinating the solid product at a temperature of 600 to 800° C. for 2 to 4 hours to form a product;
mixing the product with urea and heating to a temperature of 550 to 650° C. for 20 to 60 minutes to form the g-$C_3N_4$@CuO/MgAl$_2$O$_4$ nanocomposite.

19. The method of claim 18, wherein the fuel is menthol.

20. The method of claim 1, wherein the contacting occurs for 0.5 to 20 minutes.

* * * * *